United States Patent [19]

Marcellis et al.

[11] 4,441,929
[45] Apr. 10, 1984

[54] SUPERPLASTICIZERS FOR CEMENTITIOUS COMPOSITIONS

[75] Inventors: Alphonso W. Marcellis, Boonton; Grannis S. Johnson, Plainfield; Joseph P. Fleming, East Brunswick, all of N.J.

[73] Assignee: Diamond Shamrock Chemicals Company, Dallas, Tex.

[21] Appl. No.: 411,034

[22] Filed: Aug. 24, 1982

[51] Int. Cl.$^3$ ............................................. C04B 7/35
[52] U.S. Cl. ...................................... 106/90; 106/98; 106/314
[58] Field of Search ........................... 106/90, 98, 314

[56] References Cited

U.S. PATENT DOCUMENTS 3,429,724  2/1969  Keenum et al. .................. 106/89
3,537,869  11/1970  Proell ................................ 106/95
4,164,426  8/1979  Sinka et al. ....................... 106/90

*Primary Examiner*—James Poer
*Attorney, Agent, or Firm*—Leslie G. Nunn, Jr.

[57] ABSTRACT

Superplasticizers for cementitious compositions are produced from a raw material mixture of (1) naphthalenesulfonic acid formaldehyde condensate and (2) free sulfuric acid using a 1-step process or a 2-step process. In the 1-step process, the mixture is neutralized with a zinc compound such as zinc oxide to a pH of about 2 to obtain a superplasticizer mixture of the free acid of the naphthalenesulfonic acid formaldehyde condensate and zinc sulfate. In the 2-step process, the mixture is first neutralized with a zinc compound such as zinc oxide to a pH of about 2 and then with a base such as sodium hydroxide to a pH of about 6 to obtain a superplasticizer mixture of the sodium salt of the naphthalenesulfonic acid formaldehyde condensate and zinc sulfate. These superplasticizer mixtures are superior to a low salt content commercial sodium salt of a naphthalenesulfonic acid formaldehyde condensate where sodium sulfate content has been reduced by lime treatment.

15 Claims, No Drawings

SUPERPLASTICIZERS FOR CEMENTITIOUS COMPOSITIONS

BACKGROUND OF THE INVENTION

1. Field of the Invention

This invention relates to superplasticizers for cementitious compositions.

2. Description of the Prior Art

Cementitious compositions include cement, cement slurries, mortar, grout and concrete. Concrete is a hard, strong building material made by mixing cement, sand, gravel and water. Water in the mixture causes the cement to set and bind the entire mixture in a hard mass. It is well known in concrete technology that the strength—usually the compressive strength as measured by the ASTM test C39-72 is a reliable criterion of general quality. For this reason, the whole technology of concrete is developed around obtaining a significant and practical strength with a minimum of cost, and a maximum of convenience in use. Despite extensive research, most of the concrete presently being used are simple mixtures of sand and coarse stone containing a minor proportion of portland cement with sufficient water being added to produce a mixture fluid enough to place in forms.

It is well known in the art that, the less water used in concrete, the higher the strength; considerable research has been directed to discovering mixtures of different particle sizes of sand and stone which will give fluid concrete having minimum water content. Various organic and inorganic additives have been found, which permit reduction in the water content of concrete. One such additive, the sodium salt of naphthalenesulfonic acid formaldehyde condensate is used commercially for this purpose. See U.S. Pat. No. 2,141,569—Tucker, issued Dec. 27, 1938.

U.S. Pat. No. 3,537,869—Proell, issued Nov. 3, 1970, describes use of additives containing sulfonated condensation products of formaldehyde and naphthalene or salts thereof in concrete mixes to increase compressive strength of the hardened concrete.

U.S. Pat. No. 3,429,724—Keenum, Jr. et al, issued Feb. 25, 1969, describes use of zinc salts such as zinc chloride, zinc sulfate, zinc nitrate and zinc acetate to retard hardening of concrete mixes.

U.S. Pat. No. 4,164,426—Sinka et al, issued Aug. 14, 1979, describes use of zinc salts of naphthalenesulfonic acid formaldehyde condensation products in concrete mixes to improve compressive strength.

SUMMARY OF THE INVENTION

Superplasticizers for cementitious compositions are produced using as raw materials a mixture of (1) naphthalenesulfonic acid formaldehyde condensate and (2) free sulfuric acid in a 1-step process and in a 2-step process. In the 1-step process, the mixture is neutralized with a zinc compound such as zinc oxide to a pH of about 2 to obtain zinc sulfate along with the free acid of the naphthalenesulfonic acid formaldehyde condensate. In the 2-step process, the mixture is first neutralized with a zinc compound such as zinc oxide to a pH of about 2 and then with sodium hydroxide to a pH of about 6 to obtain a mixture of zinc sulfate and the sodium salt of the naphthalenesulfonic acid formaldehyde condensate. These two superplasticizer mixtures are superior to a low salt content commercial sodium salt of a naphthalenesulfonic acid formaldehyde condensate where the sodium sulfate content has been reduced by treatment with lime.

DETAILED DESCRIPTION

Condensation mixtures of free acids of naphthalenesulfonic acid formaldehyde condensates and sulfuric acid used as raw materials in this invention are prepared by condensing formaldehyde and naphthalenesulfonic acid at a molar ratio of about 1 to about 3 moles of formaldehyde per mole of sulfonic acid. This condensation is carried out at temperatures from about 60° C. to about 130° C., preferably from about 95° C. to about 130° C. Condensation is carried out until the condensate has a specific property such as the viscosity of aqueous salt solution. mentioned in U.S. Pat. No. 3,277,162—Johnson, issued Oct. 4, 1966 or the elution volume in U.S. Pat. No. 4,164,426—Sinka et al, issued Aug. 14, 1979.

Condensation mixtures contain (1) free acids of naphthalenesulfonic acid formaldehyde condensates and (2) free sulfuric acid from the naphthalenesulfonic acid preparation used in the condensation. These condensation mixtures are usd in the 1-step process and in the 2-step process described herein.

In the 1-step process, the condensation mixture is neutralized with a zinc compound such as zinc oxide, zinc carbonate or the like to a pH of about 2 to obtain zinc sulfate along with the free acid of the naphthalenesulfonic acid formaldehyde condensate. The resulting superplasticizer mixture may be used directly in cementitious materials such as cement slurries, mortar, grout and concrete mixes.

In the 2-step process, the condensation mixture is first neutralized with a zinc compound such as zinc oxide, zinc carbonate or the like to a pH of about 2 and then with a base such as sodium hydroxide, potassium hydroxide or the like to a pH of about 6 to obtain a mixture of zinc sulfate and a salt of the condensate such as the sodium or potassium salt of the naphthalenesulfonic acid formaldehyde condensate. The resulting superplasticizer mixture may be used directly to cementitious materials such as cement slurries, mortar, grout and concrete mixtures. If desired, the superplasticizer mixture may be dried, ground and added to dry powdered cement or cement formulations.

The superplasticizer mixtures produced by this invention may be added to cementitious materials at any point during their processing. They may be added to portland cement clinker prior to grinding and thoroughly mixed with the cement during grinding. These superplasticizer mixtures may also be added to the ground cement powder as a dry powder, slurry or water solution and the ingredients can be thoroughly mixed to disperse uniformly. The superplasticizer mixtures may be added to the water in which the cement, sand and gravel are mixed. The cement may be premixed with water and then the mixture added. In general, the superplasticizer mixture may be added to the concrete mix at any stage prior to its final hardening.

Portland cements used in the preparation of these cementitious compositions include Type I, II and III cements. The properties of the cements are well known and are described in the Portland Cement Association Engineering Bulletin entitled, "Design and Control of Concrete Mixtures", Eleventh Edition, July 1968 and "Kirk-Othmer Encyclopedia of Chemical Technology", Third Edition (Interscience Publishers, N.Y., N.Y., 1979), Volume 5, pages 163–193. The teaching as to the properties of these cements are disclosed in these publications and are incorporated by reference herein.

These cements may be used to prepare cementitious compositions such as concrete mixes containing 100 parts by weight of cement, from about 140 to about 260 parts by weight of sand, from about 100 to about 200 parts by weight of gravel, from about 35 to about 60 parts by weight of water and an effective amount of one of the superplasticizer mixtures sufficient to improve compressive strength of the hardened concrete with the preferred concrete mixes containing 100 parts by weight of cement, from about 160 to about 230 parts by weight of sand, from about 140 to about 180 parts by weight of gravel, from about 38 to about 50 parts by weight of water and an effective amount of one of the superplasticizer mixtures sufficient to improve compressive strength of the hardened concrete. Concentration of the superplasticizer mixture in the concrete mixes may vary from about 0.05 to about 3%, preferably from about 0.3 to about 1% (by weight of cement) to obtain hardened concrete having improved compressive strength. After preparation, these concrete mixes are then allowed to harden to obtain hardened concretes having improved compressive strengths.

Cementitious compositions such as mortar mixes containing 100 parts by weight of cement, from about 200 to about 400 parts by weight of sand and from about 38 to about 50 parts by weight of water are prepared by adding an effective amount of one of the superplasticizer mixtures sufficient to improve the compressive strength of the hardened mortar. Concentration of from about 0.05 to about 3.0% by weight of the superplasticizer based on weight of cement in the mortar are sufficient to improve the compressive strength of mortars.

For a fuller understanding of the nature and advantages of this invention, reference may be made to the following examples. These examples are given merely to illustrate the invention and are not to be construed in a limiting sense. All quantities, proportions and percentages are by weight and all references to temperature are °C. unless otherwise indicated.

EXAMPLE I

A total of 255 g of a mixture of naphthalenesulfonic acid formaldehyde condensate containing 5.22% by weight or 13.31 g (0.14 moles) of free sulfuric acid was neutralized with 11.0 g (0.14 moles) of zinc oxide in 33 g of water to a pH of 2. It was then neutralized with 39.0 g of 50% by weight (19.5 g of 100%; 0.49 moles) sodium hydroxide solution to a pH of 5.9. The neutralized mixture did not precipitate on repeated freeze-thawing. Use of this mixture in concrete gave a 7 day compressive strength of 5048 psi compared to 4119 psi for commercial sodium salt of naphthalenesulfonic acid formaldehyde condensate which had been treated with lime and filtered to reduce its sodium sulfate content and then neutralized with sodium hydroxide.

EXAMPLE II

A total of 255.0 g of naphthalenesulfonic acid formaldehyde condensate containing 5.22% free sulfuric acid (13.3 g, 0.14 moles) was neutralized to a pH of 2 using 11.0 g (0.14 moles) of zinc oxide in 33 g of water. The product contained 46% solids. This mixture was evaluated in concrete and gave a 7-day compressive strength of 5321 psi compared to 4119 psi for commercial sodium salt of naphthalenesulfonic acid formaldehyde condensate which had been treated with lime to reduce its sodium sulfate content and then neutralized with sodium hydroxide.

EXAMPLE III

Charged 2550 g of a mixture of naphthalenesulfonic acid formaldehyde condensate containing 5.22% free sulfuric acid (133 g, 1.36 moles) to a large beaker. Prepared a slurry of 110.0 g (1.36 moles) of zinc oxide in 330 g of water. The slurry was added with vigorous stirring to the mixture to adjust the pH to about 2. An aqueous solution of 50% sodium hydroxide, approximately 360 g (180 g of 100% active, 4.5 moles) was added to adjust the pH to 5.15. The moisture content was 59.0% by weight.

EXAMPLE IV

To a large beaker charged a slurry of 129 g (1.59 moles) of zinc oxide in 388.0 of water. Added gradually 3000.0 g of naphthalenesulfonic acid formaldehyde condensate containing 5.22% free sulfuric acid (156.6 g, 1.60 moles) while stirring vigorously. Added 424.0 g of 50% sodium hydroxide (212.0 g of 100%, 5.30 moles). The pH was 3.6 at this point and was adjusted to pH of 5.1 with a small additional amount of 50% sodium hydroxide. The percent solids were 41%. The mixture contained 6.5% zinc sulfate.

EXAMPLE V

Evaluations in Concrete

The following example describes the evaluation of 0.5% based on the weight of cement of mixture of $ZnSO_4$ and the sodium salt of naphthalenesulfonic acid formaldehyde condensate produced by the 2-step process and mixture of $ZnSO_4$ and the free acid of naphthalenesulfonic acid formaldehyde condensate produced by the 1-step process based on the weight of cement in the concrete mix and a control concrete mix. Table I entitled, "Standard Mix Proportion Non-Air Entrained Concrete" shows the standard mix proportion used in the concrete mixes. This table is from the Portland Cement Association Engineering Bulletin entitled, "Design and Control of Concrete Mixtures", Eleventh Edition, July 1968. The standard mix proportion given in Table I was used as the control giving a reasonable workability for the tests. In the evaluation of the additives, water in the standard mix was reduced 16% to achieve a workable concrete mix. The cement used was Type I. Sand and ⅜ inch (10 mm) gravel meeting ASTM standard C33-74a, were used. Except for a minor modification, the concrete batching procedure using a 2½ cu ft (0.07 m³) tilting drum mixer followed ASTM standard C192-69. This variation, which results in better reproducibility in the properties of wet concrete, involves adding the additive with the last volume of water rather than initially with the gravel.

Slump was measured according to ASTM standard C143-74. The air content in the fresh concrete was periodically checked by the pressure method (ASTM standard C231-75); however, for convenience, the Chaser air indicator was used more frequently. Specimens used for compressive strength testing were 3×6 in (75×150 mm) cylinders, consolidated by rodding and cured at 70°–75° F. and at 100% relative humidity. Data were collected at 1, 7 and 28 days based on the average of values obtained from three cylinders following ASTM standard C39-72. Results of these evaluations are shown in Table II entitled, "Compressive Strength and Slump on Concrete at 16% Water Reduction".

TABLE I

Standard Mix Proportion
Non-Air Entrained Concrete

Water/Cement Ratio = 0.5
Coarse Aggregate = ⅜ in. (10 mm)
Fine Aggregate = Fineness Modulus 2.9

| Component | Weight lb. | kg. |
|---|---|---|
| Cement | 770 | 349.3 |
| Water | 385 | 174.6 |
| Sand | 1510 | 663.9 |
| Gravel | 1150 | 521.6 |

Table II gives comparative data on water reduction and compressive strengths. The "Control" in Table II was a concrete mix that contained 0.5% of a low salt content commercial sodium salt of naphthalenesulfonic acid formaldehyde condensate.

Air entrainment, expressed as % air for all the blends, was in the proper range for good workability.

The data show that mixtures of zinc sulfate and the sodium salt of naphthalenesulfonic acid formaldehyde condensate made by the 2-step process and mixtures of zinc sulfate and the free acid of naphthalenesulfonic acid formaldehyde condensate made by the 1-step process have 7-day compressive strength that are appreciably higher than the control 23% and 29% respectively while the 28-day compressive strengths are both about 9% higher than the control.

TABLE II

Compressive Strength and
Slump on Concrete at 16% Water Reduction

| Example No. | Description | % Air | Slump (in.) | Compressive Strength (Days) 1 | 7 | 28 |
|---|---|---|---|---|---|---|
| — | control sodium salt of naphthalene sulfonic acid formaldehyde condensate | 4 | 6 | 3345 | 4119 | 5719 |
| I | mixture of sodium naphthalene sulfonic acid formaldehyde condensate and zinc sulfate made by the 2-step process | 3.5 | 4½ | 3369 | 5048 | 6250 |
| II | mixture of naphthalene sulfonic acid formaldehyde condensate and zinc sulfate made by the 1-step process | 4.5 | 2 | 3512 | 5321 | 6250 |

EXAMPLE VI

This example describes evaluation in mortar of mixtures of zinc sulfate and naphthalenesulfonic acid condensates.

Samples from Examples I and II and the control were evaluated for slump, air and compressive strength and compared to the control in a mortar type mix described in Table III.

TABLE III

Proportions Used in Mortar Type Mix

| Component | Lab Mix Weight (grams) |
|---|---|
| Cement - Type I | 400 |
| Sand (Fineness Modulus 7.9) | 1200 |
| Gravel (10 mm) | 0 |
| Water | 167.5 |

In the concrete batching procedure, a Hobart mixer was used. The sand was added to the mixer and water containing the additive and the cement were added simultaneously to the sand. The cement was mixed for 3 minutes, allowed to stand for 3 minutes and mixed for an additional 2 minutes. Batching was done at 70°-75° F. and a 50% relative humidity.

Slump was measured immediately after mixing using a pipe (4¼" H×3" ID) set in a flat plate. The pipe was filled incrementally ⅓ at a time and consolidated by rodding after each increment was added. The top of the pipe was struck flat and the base cleared of extraneous cement. The pipe was then raised and the slump measured in inches as the difference between the top of the pipe and the top of the cement. Air content in the fresh cement was checked using a Chaser air indicator. Specimens used for compressive strength testing were 3×6 in. (75×150 mm) cylinders consolidated by rodding and cured at 70°-75° F., and 100% relative humidity. Data were collected after 7 days based on an average of values obtained from three cylinders following ASTM standard C-39-72. Results of these evaluations are shown in Table IV entitled, Cement Evaluations at 18% Water Reduction.

TABLE IV

Cement Evaluations at 18% Water Reduction

| Example No. | % Active | Additive Added (g) | Slump (in.) | % Air Content | 7-Day Compressive Strength (Av. of 3) |
|---|---|---|---|---|---|
| Control[1] | 40 | 10.0 | 1¾ | 4+ | 3735 |
| I | 41 | 10.25 | 1¾ | 3.5 | 3429 |
| II | 40 | 10 | 1¾ | 3.25 | 3685 |

[1]Commercial sodium salt of naphthalenesulfonic acid formaldehyde condensate with sodium sulfate removed.

Results in Table IV show the superplasticizers of Example I and Example II are equivalent to the low salt content sodium salt of naphthalenesulfonic acid formaldehyde condensate used as the control in compressive strength. In addition, these superplasticizers have the advantage of not requiring liming. Further, their solutions have the low temperature stability properties shown in Example VII below.

EXAMPLE VII

The test data shown in Table V demonstrates the excellent low temperature properties of mixtures of $ZnSO_4$ and sodium salt of naphthalenesulfonic acid formaldehyde condensate and $ZnSO_4$ and the acid form of naphthalenesulfonic acid formaldehyde condensate which compare favorably to a low (>3.0% on 100% active basis) sodium sulfate product (Control I). This is compared to a high (about 12% on 100% active basis) sodium sulfate product high salt commercial condensate with sodium sulfate present (Control II) which crystallizes upon storage at 22° F.

TABLE V

| Example No. | Description | 2 Weeks Storage at 22° F. (−5° C.) |
|---|---|---|
| Control I | low salt condensate (>3% on 100% basis) | remains clear |
| I | mixture of ZnSO₄ and sodium salt of condensate | remains clear |
| II | mixture of ZnSO₄ and acid form of condensate | remains clear |
| Control II | high salt condensate (12% on 100% active basis) | precipitate forms |

While the invention has been described with reference to certain specific embodiments thereof, it is understood that it is not to be so limited since alterations and changes may be made therein which are within the full and intended scope of the appended claims.

What is claimed is:

1. A superplasticizer for cementitious compositions selected for the group consisting of:
   (a) a mixture of from about 90.0 to about 96.0 parts by weight of a free acid of naphthalenesulfonic acid formaldehyde condensate and from about 4.0 to about 10.0 parts by weight of zinc sulfate; and
   (b) a mixture of from about 90.0 to about 96.0 parts by weight of a salt of naphthalenesulfonic formaldehyde condensate and from about 4.0 to about 10.0 parts by weight of zinc sulfate.

2. The superplasticizer of claim 1 wherein the superplasticizer is the mixture of a free acid of a naphthalenesulfonic formaldehyde condensate and zinc sulfate.

3. The superplasticizer of claim 1 wherein the superplasticizer is the mixture of a sodium salt of a naphthalenesulfonic formaldehyde condensate and zinc sulfate.

4. A process for the superplasticizer of claim 1 for cementitious compositions which is a 1-step process comprising neutralizing a mixture of free acid of naphthalenesulfonic formaldehyde condensate and sulfuric acid with a zinc compound selected from the group consisting of zinc oxide and zinc carbonate to a pH of about 2 to obtain a mixture of free acid of naphthalenesulfonic formaldehyde condensate and zinc sulfate.

5. A process for the superplasticizer of claim 1 for cementitious compositions which is a 2-step process comprising neutralizing a mixture of free acid of naphthalenesulfonic formaldehyde condensate and sulfuric acid with a zinc compound selected from the group consisting of zinc oxide and zinc carbonate to a pH of about 2 to obtain a mixture of free acid of naphthalenesulfonic acid formaldehyde condensate and zinc sulfate and then neutralizing the free acid with a base selected from the group consisting of sodium hydroxide and potassium hydroxide to a pH of about 6 to obtain a mixture of a salt of naphthalenesulfonic formaldehyde condensate and zinc sulfate.

6. A hardened cementitious composition characterized by enhanced compressive strength prepared from cementitious composition and an effective amount of the superplasticizer of claim 1.

7. A hardened cementitious composition of claim 6 characterized by enhanced compressive strength prepared from a concrete mix containing 100 parts by weight of cement, from about 140 to about 260 parts by weight of sand, from about 100 to about 200 parts by weight of gravel, from about 35 to about 60 parts by weight of water.

8. The hardened cementitious composition of claim 6 wherein the composition is prepared from a mortar mix containing 100 parts by weight of cement, from about 200 to about 400 parts by weight of sand and from about 38 to about 50 parts by weight of water.

9. The hardened cementitious composition of claim 7 wherein from about 0.1 to about 5.0% by weight of the superplasticizer based on weight of cement is present.

10. The hardened cementitious composition of claim 8 wherein from about 0.05 to about 3.0% by weight of the superplasticizer based on weight of cement is present.

11. A process for production of a hardened cementitious composition characterized by enhanced compressive strength comprising adding to a cementitious composition an effective amount of the superplasticizer of claim 1.

12. The process of claim 11 wherein the cementitious composition is a concrete mix containing 100 parts by weight of cement, from about 140 to about 260 parts by weight of sand, from about 100 to about 200 parts by weight of gravel, and from about 35 to about 60 parts by weight of water.

13. The process of claim 11 wherein the cementitious composition is a mortar mix containing 100 parts by weight of cement, from about 200 to about 400 parts by weight of sand and from about 38 to about 50 parts by weight of water.

14. The process of claim 12 wherein from 0.1 to about 5.0% by weight of the superplasticizer based on weight of cement is present.

15. The process of claim 13 wherein from about 0.05 to about 3.0% by weight of the superplasticizer based on weight of cement is present.

* * * * *